United States Patent [19]

Sellers

[11] Patent Number: 5,768,239
[45] Date of Patent: Jun. 16, 1998

[54] COMPACT COMPUTER MEMORY MEDIA HANDLING APPARATUS

[75] Inventor: Charles A. Sellers, Houston, Tex.

[73] Assignee: Compaq Computer Corporation, Houston, Tex.

[21] Appl. No.: 616,662

[22] Filed: Mar. 15, 1996

[51] Int. Cl.$^6$ ........................................... G11B 33/02
[52] U.S. Cl. ............................ 369/75.2; 369/77.1
[58] Field of Search ........................... 369/75.1–75.2, 369/77.1–77.2, 81; 360/99.02, 99.06, 99.12

[56] References Cited

U.S. PATENT DOCUMENTS

| 4,712,145 | 12/1987 | Naruki et al. | 360/93 |
| 4,890,179 | 12/1989 | Baker | 360/132 |
| 5,301,176 | 4/1994 | Kawachi et al. | 369/75.2 |
| 5,463,509 | 10/1995 | Suzuki et al. | 369/77.2 |
| 5,481,420 | 1/1996 | Cardona et al. | 369/77.2 |

FOREIGN PATENT DOCUMENTS

| 858318 | 12/1952 | Germany | 369/77.1 |
| 1-3888 | 1/1989 | Japan . | |
| 0112479 | 11/1944 | Netherlands | 369/77.1 |

OTHER PUBLICATIONS

Personal Computing Magazine, vol. 13, No. 2, p. 19, Feb. 1989.

*Primary Examiner*—Allen Cao
*Attorney, Agent, or Firm*—Konneker & Smith, P.C.

[57] ABSTRACT

A compact disc drive is mounted within a computer chassis with the rotatable spindle portion of the drive positioned inwardly adjacent an external wall of the chassis a distance substantially less than the radius of a compact disc operatively supportable on the spindle for driven rotation thereby. When a compact disc is placed on the spindle a substantial portion of the disc projects outwardly beyond the chassis during operation of the drive. In this manner, the interior chassis space required for the drive is substantially reduced. To shield the outwardly projecting disc portion during use of the drive a housing structure is carried by the chassis for movement relative thereto between a retracted position in which the housing structure is telescoped with the drive within the chassis interior when the drive is not in use, and an extended position in which the housing structure extends outwardly from the chassis and receives the outwardly projecting disc portion when the drive is operating. A floppy disc drive embodiment of the invention is also illustrated.

8 Claims, 2 Drawing Sheets

5,768,239

1

COMPACT COMPUTER MEMORY MEDIA HANDLING APPARATUS

BACKGROUND OF THE INVENTION

1. Field of the Invention

The present invention generally relates to electronic apparatus and, in a preferred embodiment thereof, more particularly relates to computer-incorporated apparatus for handling rotatable disc-type stored data devices such as compact discs and floppy discs.

2. Description of Related Art

Rotatable disc-type data storage devices, such as compact discs and floppy discs, are typically used in conjunction with associated drive units mounted within the interior of a computer chassis. The drive unit includes, among other operating components, a rotationally drivable spindle member upon which the data storage disc may be placed for driven rotation thereby, and a reciprocable read/write head structure for engaging the rotating disc and transferring data therefrom or thereto as the case may be.

To operatively position the data storage disc on the spindle, the overall data storage device is appropriately inserted into the interior of the chassis, for example inserted through a chassis wall slot or inwardly transported on a loading tray, in a manner operatively positioning the data storage disc on the rotationally drivable spindle member. The drive that receives the data storage device includes a housing which is conventionally disposed entirely within the interior of the computer chassis and is sized to receive the entire data storage device internally within the chassis.

Because the overall drive structure has volumetric portions disposed wholly within the chassis interior and dedicated to (1) operating the data storage device and (2) physically receiving the data storage device in its entirety, the drive structure tends to occupy a substantial interior portion of the chassis. As can be appreciated, in keeping with the ongoing design effort to further reduce the size of computer apparatus in general, it would be quite desirable to reduce the interior computer chassis volume that must be dedicated to the above-described type of data storage device drive structures. Such an interior chassis volume requirement would advantageously permit the exterior size of the chassis to be reduced, or free up interior chassis space for additional computer components therein, as desired. It is accordingly an object of the present invention to provide improved computer apparatus having an associated data storage device drive with reduced interior chassis space requirements.

SUMMARY OF THE INVENTION

In carrying out principles of the present invention, in accordance with a preferred embodiment thereof, computer apparatus is provided that includes a chassis having an exterior space and an exterior wall portion including an exterior wall member. The exterior wall portion has opening means therein through which a portion of a data storage device, such as a compact disc or a floppy disc, may be inserted into the interior chassis space. The data storage device has a generally disc-shaped data storage member with a radius.

A drive structure is provided, and includes a rotationally drivable spindle member operative to support the data storage device, upon insertion thereof inwardly through the opening means, and rotate the storage member about an axis generally parallel to the exterior wall member, and a movable data transfer head structure positioned to operatively engage the rotating storage member.

According to a key aspect of the invention, the spindle member is inwardly spaced apart from the exterior chassis wall member by a distance substantially less than the data storage member radius. In this manner a substantial portion of the spindle member-supported data storage member projects outwardly beyond the exterior wall member to thereby materially reduce the interior chassis space required by the drive structure. Thus, the overall size of the chassis may be reduced, or more computer equipment may be placed therein, as desired.

In accordance with another feature of the invention, in an illustrated preferred embodiment thereof, the computer apparatus further includes a housing structure supported on the chassis for movement relative thereto between a retracted position in which the housing structure extends through the exterior wall member into the interior chassis space in a telescoped relationship with the drive structure, and an extended position in which the housing structure extends outwardly beyond the exterior wall member. The housing structure in its extended position is operative to receive and shield the outwardly projecting portion of the spindle member-supported data storage member.

In a preferred embodiment of the computer apparatus the exterior wall portion of the chassis includes an external wall section extending transversely to the exterior wall member and outwardly overlying the drive spindle member, and the opening means include a first opening extending through the external wall section. The housing structure has a second opening therein which, with the housing structure extended outwardly from the chassis, forms with the first opening a combined opening through which the date storage member may be inserted and operatively placed on the spindle member. The computer apparatus also representatively includes cover means, carried by the chassis and the housing structure, for selectively covering and uncovering the first and second openings.

The cover means representatively include a first cover plate member secured to the chassis for pivotal movement relative thereto between first and second positions in which the first cover plate member respectively covers and uncovers the first opening, and a second cover plate member secured to the housing structure for pivotal movement relative thereto between first and second positions in which the second cover plate member respectively covers and uncovers the second opening. With the housing structure in its retracted position, and the first and second cover plate members in their first positions, the first cover plate member overlies the second cover plate member in a facing, generally parallel relationship therewith.

BRIEF DESCRIPTION OF THE DRAWINGS

2A and 2B and sequentially illustrate in more detail the operation of the collapsible CD drive structure.

DETAILED DESCRIPTION

Figure 1A:
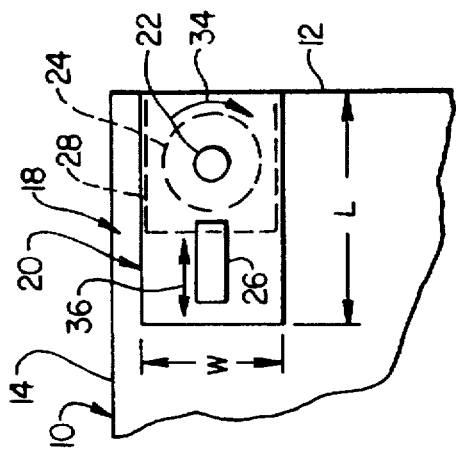
FIGS. 1A–1C (Prior Art) are highly schematic, downwardly directed cross-sectional views through a computer CPU housing and sequentially illustrate the loading and operation of a conventionally configured stored media handling device, representatively a CD drive, installed therein.
Figure 1B:
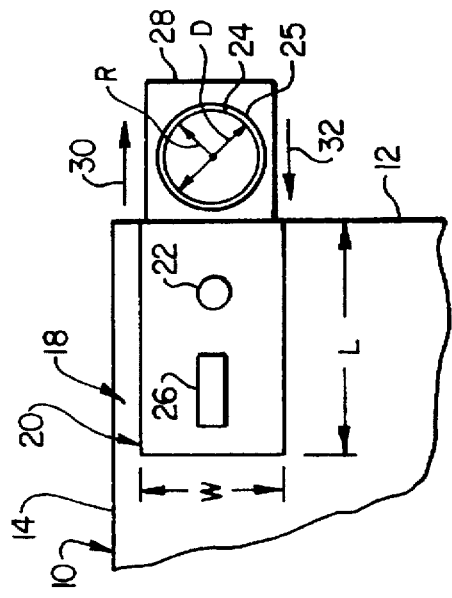
Figure 1C:
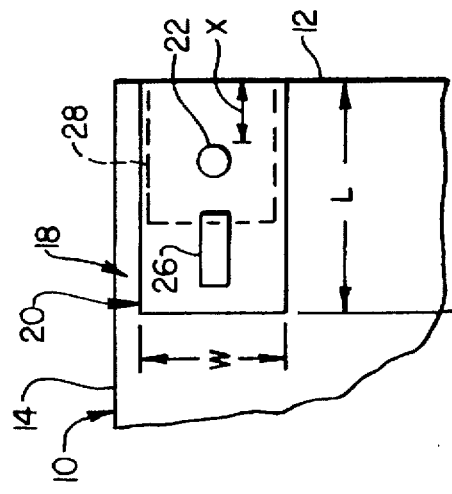
Figure 3A:
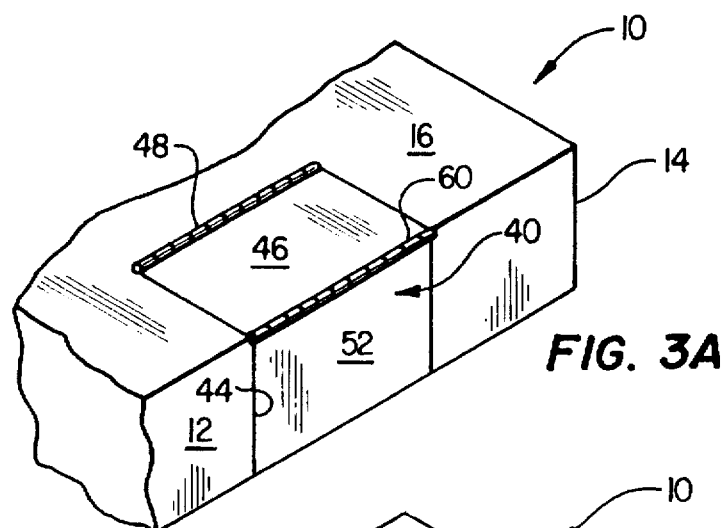
FIGS. 3A–3C are enlarged scale, highly simplified perspective views of the CPU housing portion shown in FIGS.
Figure 3B:
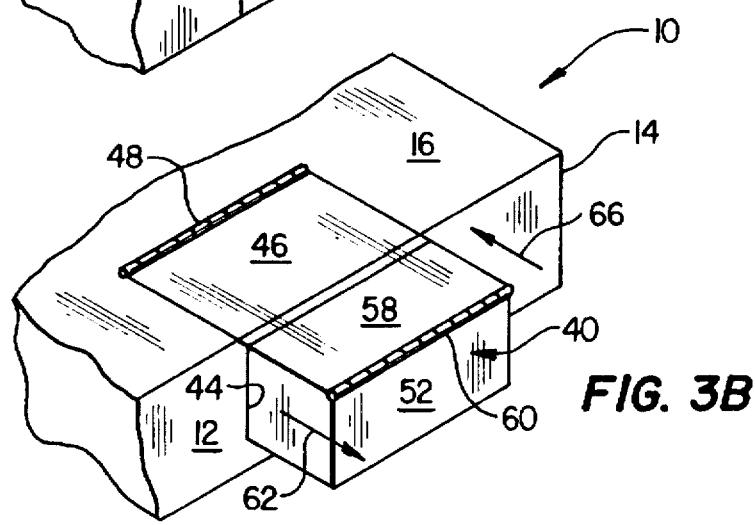
Figure 3C:
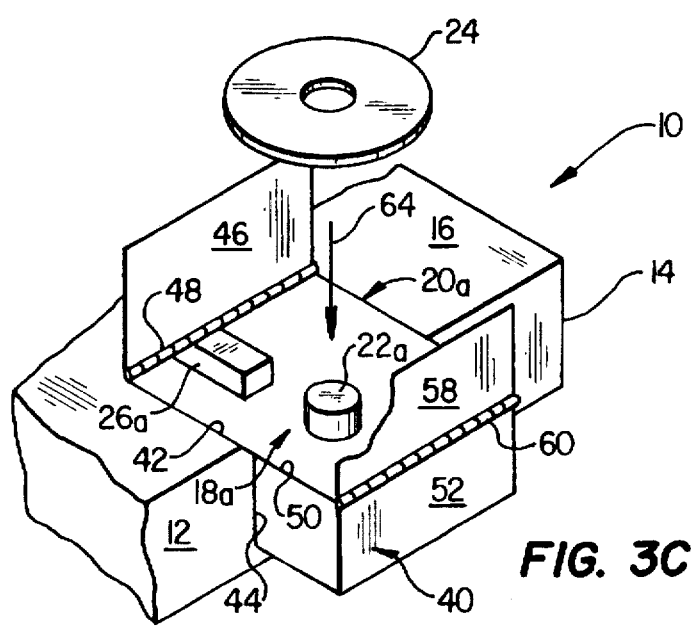

Cross-sectionally illustrated in highly schematic form in FIGS. 1A–1C (Prior Art) is a portion of a representative computer CPU housing 10 having a front vertical side wall 12, a right vertical side wall 14, and a top wall 16 (shown perspectively in FIGS. 3A–3C). A conventional stored memory media handling device, representatively a compact disc drive 18, is mounted within the interior of the CPU housing 10 and has a rectangular outer housing structure 20 with (relative to the housing 10) a front-to-rear length L, a left-to-right width, and a vertical height H (not shown).

Carried within the drive housing structure 20 is a rotatable spindle 22 upon which a compact disc 24 having a radius R (see FIG. 1B) may be placed and rotationally driven by the spindle, and a read/write head structure 26 reciprocable in a front-to-rear direction and operatively engageable with the rotating disc to effect the necessary data transfer thereto or therefrom in a conventional manner. The spindle centerline is rearwardly spaced from the front CPU housing wall 12 a distance X (see FIG. 1A) somewhat greater than the disc radius R, and the width W and length L of the drive housing 20 are greater than the disc diameter D.

The conventional CD drive 18 is illustrated in FIG. 1A in its pre-loading state, ready for the insertion therein of the disc 24 in a manner subsequently described, and occupies within the interior of the CPU housing 10 a volume equal to the quantity LWH, with H being the previously mentioned vertical height of the CD drive 18. Telescoped into the interior of the CPU housing 10, through an appropriate opening in its front side wall 12, is a conventional loading and support tray portion 28 of the drive 18 which is positioned above the spindle 22.

Referring now to FIG. 1B (Prior Art), when it desired to operate the CD drive 18 its loading and support tray 28 is moved forwardly out of the CPU housing 10 as illustrated by the arrow 30 in FIG. 1B. The disc 24 is then downwardly placed in a complementarily configured circular depression 25 formed in the tray 24. Tray 24 is then moved rearwardly back into the interior of the CPU housing 10 as indicated by the arrow 32 in FIG. 1B.

This return of the tray 28 to the interior of the CPU housing 10 brings the CD drive 18 to its loaded operating state, as illustrated in FIG. 1C (Prior Art), in which the disc 24 is operatively positioned atop the spindle 22 which may be rotationally driven, as indicated by the arrow 34 while the read/write head 26 is horizontally reciprocated (as indicated by the double-ended arrow 36) to transfer data to or from the loaded disc 24.

As can readily seen by comparing FIGS. 1A and 1C, using the illustrated conventional design for the CD drive 18 the operating volume of the drive (FIG. 1C) is identical to it volume LWH (FIG. 1A) during nonoperating periods of the drive 18, with all of the volume LWH being disposed within the CPU housing 10. In a unique manner which will now be described, the present invention substantially reduces the interior CPU housing volume that must be dedicated to the CD drive. This space reduction provides more space within the CPU housing 10 for other equipment, or permits the overall size of the CPU housing 10 to be reduced if desired.

Figure 2A:
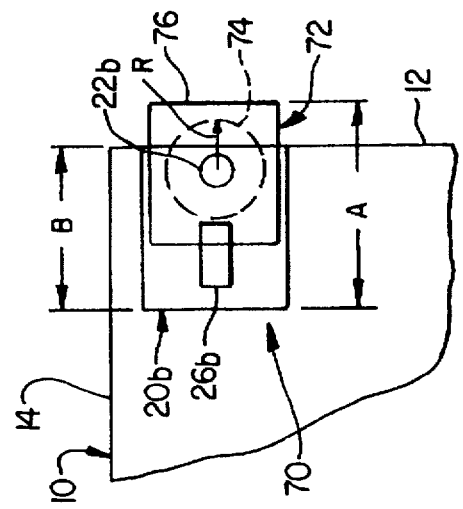
FIGS. 2A and 2B are highly schematic, downwardly directed cross-sectional views through a computer CPU housing and respectively illustrate the retracted and expanded positions of a specially designed collapsible CD drive structure installed in the CPU housing and embodying principles of the present invention.
Figure 2B:
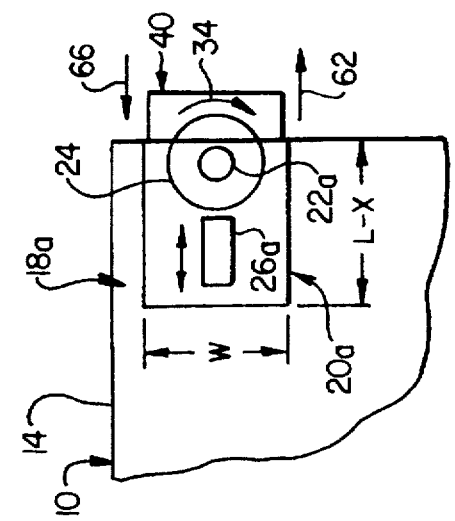

Schematically illustrated in FIGS. 2A and 2B is a specially designed CD drive 18a embodying principles of the present invention and operatively installed in the aforementioned CPU housing 10 inwardly adjacent its front side wall 12. For ease in comparing the CD drive 18a to the previously described CD drive 18, components in the drive 18a similar to those in the drive 18 have been given identical reference numerals having the subscript "a".

According to a key aspect of the present invention, it can be seen by comparing FIGS. 1A and 2A that the front-to-rear length of the housing structure 20a of the CD drive 18a of the present invention (FIG. 2A) has been shortened by a distance X compared to the front-to-rear length L of the conventional drive housing structure 20 (FIG. 1A). This length reduction is effected at the front end of the housing structure 20a in a manner such that, with the CD drive 18a in its pre-loading state shown in FIG. 2A, the housing structure 20a has been shifted forwardly relative to its conventional counterpart housing structure 20 with the spindle 22a being disposed inwardly adjacent the front CPU housing wall 12, the spindle 22a now being positioned a distance substantially less than the disc radius R inwardly away from the CPU housing front side wall 12.

The removal of a front end portion of the drive housing 20a relative to the longer conventional drive housing 20 thereby reduces the length of the housing 20 to (L–X) and correspondingly reduces the volume occupied by the drive housing structure 20a in its pre-loading state within the CPU housing 10 to (L–X)WH. As can be seen in FIG. 2A, this shortening and forward shifting within the CPU housing 10 of the drive housing 20a compared to the conventional drive housing 20 frees up a space S equal to the dotted line volume XWH within the interior of the CPU housing 10 which can be used to either place more equipment in the CPU housing 10 or to reduce its size if desired.

This desirable space savings S within the interior of the CPU housing 10 also maintained with the CD drive 18a in its operating state (i.e., with the disc 24 loaded therein) by means of a unique telescoping drive housing extension structure 40 secured to the front end of the drive housing 20a.

With reference now to FIGS. 2B and 3A–3C, to accommodate the modified CD drive 20a disposed in the CPU housing 10, a rectangular top side wall opening 42 (see FIG. 3C) is formed in the CPU housing 10 at its front side edge and is disposed over the top side of the CD drive housing structure 20a. At its front end the top side wall opening 42 meets a downwardly extending rectangular opening 44 formed in the front side wall 12 of the CPU housing 10. A rectangular access plate 46 normally overlies and covers the top side wall opening 44 (see FIGS. 3A and 3B) is hinged along a rear side thereof, as at 48, to permit the plate 46 to be upwardly pivoted to its FIG. 3C loading position to uncover the opening 42.

The drive housing extension structure 40 has a rectangular configuration with an open top side 50, a front end wall 52, a pair of opposite left and right side walls 54 and 56, and a rectangular access plate 58 (see FIGS. 3B and 3C) that is pivotally connected to the top side edge of wall 52, by a suitable hinge structure 60, for pivotal movement between a horizontal position (FIG. 3B) in which the plate covers the top side opening 50 of the housing extension structure 40, and a vertical position (FIG. 3C) in which the plate 58 uncovers the opening 50.

Prior to the use of the disc 24 (see FIG. 3C), the housing extension structure 40 is in its FIG. 3A pre-loading orientation in which it is telescoped within the CPU housing 10 with the access plate 58 (see FIG. 3B) in its horizontal covering orientation, the front side wall 52 of the extension structure 40 generally flush with the front side wall 12 of the CPU housing 10, and the CPU housing top access plate 46 being in its horizontal closed orientation and overlying the extension housing access plate 58.

When it is desired to load the media storage disc 24 into the CD drive 18a, the drive housing extension structure 40 is moved forwardly out of the CPU housing 10 to its extended operating orientation shown in FIG. 3B, as indicated by the arrow 62. Next, as shown in FIG. 3C, the access plates 46 and 58 are lifted, and the disc 24 is lowered onto the spindle 22a as indicated by the arrow 64 in FIG. 3C. Then, as shown in FIG. 3B, the access plates 46,58 are closed to bring the now extended housing structure 20a,40 to its operating orientation (also shown in FIG. 2B) to permit driven rotation of the loaded disc 24 as indicated by the arrow 34 in FIG. 2B.

After use of the loaded disc 24 is over, the access plates 46,58 are simply opened (see FIG. 3C), the disc 24 upwardly removed from the extended housing structure 20a,40, and the access plates 46,58 returned to their closed positions as shown in FIG. 3B. The drive housing extension structure 40 is then rearwardly telescoped back into the CPU housing 10, as indicated by the arrow 66 in FIG. 3B, to return the CD drive 18a to its rearwardly shortened pre-loading orientation shown in FIGS. 2A and 3A.

As can be seen, according to a key aspect of the present invention, during use of the CD drive 18a a portion of the overall drive housing structure 20a,40 (as well as a front end portion of the loaded disc 24) projects outwardly beyond the CPU housing 10 as shown in FIGS. 2B and 3B. Thus, a portion of the overall volume required to receive, support and operate the disc 24 is advantageously shifted out of the interior of the CPU housing 10 to the exterior thereof. However, as described above, this addition to the exterior size of the CPU housing 10 is only temporary (i.e., only during the actual use of the disc 24) and can conveniently be eliminated after the disc 24 is removed. Thus, by utilizing the CD drive 18a just described the interior CPU housing space requirements for the drive are reduced without permanently adding a corresponding required disc-handling volume to the exterior of the CPU housing 10.

Figure 4:
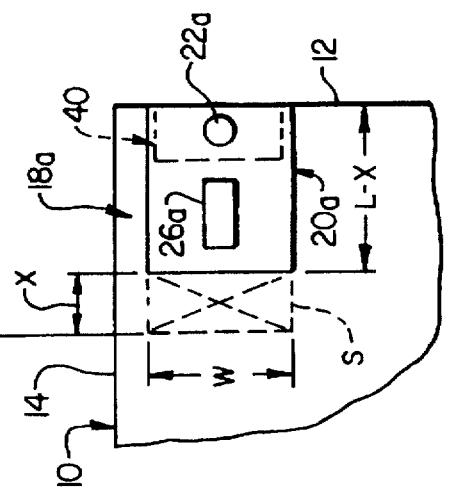
FIG. 4 is a highly simplified perspective view of a CPU housing portion having incorporated therein a specially positioned floppy disc drive illustrating an alternate embodiment of the present invention.

As will be readily be appreciated by those of skill in this particular art, the representatively illustrated compact disc 24 is not the only type of rotationally drivable media storage device that could be installed in the CPU housing 10. For example, utilizing principles of the present invention, a shortened-length floppy disc drive 70 (see FIG. 4) could also be installed in the CPU housing 10 to operatively receive a conventional floppy disc 72 in which a rotatable media storage disc 74 having a radius R is supported in a relatively thin rigid rectangular housing 76.

The floppy disc drive 70 has a rectangular housing 20b in which are disposed a rotatable spindle 26b and a horizontally reciprocable read/write head structure 26b. As in the case of the previously described CD drive 18, the spindle 22b of the floppy disc drive 70 is positioned inwardly apart from the CPU housing front side wall 12 a distance substantially less than the radius R of the media storage disc 74. Accordingly, when the floppy disc 72 is operatively inserted into its associated drive 70 (through an appropriate slot in the front CPU housing side wall 12), a substantial portion of the rotatable media storage disc 74 is disposed externally of the CPU housing 10.

In this manner, of the total front-to-rear drive housing and disc length A that would otherwise be occupied within the CPU housing interior, only the shortened front-to-rear length B of the drive housing structure 20b is taken up within the CPU housing 10, thereby allowing more equipment to be located in the housing 10, or permitting it to be of a smaller size if desired. As in the case of the previously described CD drive 18, the inward spacing apart of the spindle 22b from the CPU housing wall 12 by a distance substantially less than the radius R of the rotatable media storage disc 74 permits this advantageously reduced drive mounting space requirement within the CPU housing 10.

The foregoing detailed description is to be clearly understood as being given by way of illustration and example only, the spirit and scope of the present invention being limited solely by the appended claims.

What is claimed is:

1. Computer apparatus comprising:
    an outer housing having an interior space and an exterior wall portion including an exterior wall member, said wall portion having opening means therein for inwardly receiving a portion of a rotatable, generally cylindrical data storage member having a radius transverse to a rotational axis thereof;
    a drive structure disposed in said interior space and including a rotationally drivable spindle member operative to support the data storage member with its rotational axis generally parallel to said exterior wall member, upon insertion thereof inwardly through said opening means, and rotate the data storage member about its rotational axis, said spindle member being inwardly spaced apart from said exterior wall member by a distance substantially less than the radius of the data storage member, wherein a substantial portion of the spindle member-supported data storage member projects outwardly beyond said exterior wall member to thereby materially reduce the interior outer housing space required by said drive structure; and
    housing means, carried by said outer housing, for receiving and shielding the outwardly projecting data storage member portion during operation of said drive structure, said housing means being retractable into said outer housing interior space when the data storage member is removed from said drive structure.

2. The computer apparatus of claim 1 wherein:
    said drive structure is a compact disc drive.

3. The computer apparatus of claim 1 wherein:
    said housing means, when retracted into said outer housing interior space, are telescoped with said drive structure.

4. Computer apparatus comprising:
    an outer housing having an interior space and an exterior wall portion including an exterior wall member, said wall portion having opening means therein for inwardly receiving a radial portion of a generally disc-shaped data storage member having a radius;
    a drive structure disposed in said interior space and including a rotationally drivable spindle member operative to support the data storage device, upon insertion thereof inwardly through said opening means, and rotate the storage member about an axis generally parallel to said exterior wall member, and a movable data transfer head structure positioned to operatively interact with the rotating data storage member,
        said spindle member being inwardly spaced apart from said exterior wall member by a distance substantially less than said data storage member radius, wherein a substantial portion of the spindle member-supported data storage member projects outwardly beyond said exterior wall member to thereby materially reduce the interior outer housing space required by said drive structure; and a housing structure supported on said outer housing for movement relative thereto between a retracted position in which said housing structure extends through said exterior wall member into said outer housing interior space in a telescoped relationship with said drive structure, and an extended position in which said housing structure extends outwardly beyond said exterior wall member, said housing structure in said extended position being operative to receive and shield the outwardly projecting portion of the spindle member-supported data storage member during operation of said drive structure.

5. Computer apparatus comprising:

an outer housing having an interior space and an exterior wall portion including an exterior wall member, said wall portion having opening means therein for inwardly receiving a portion of a rotatable, generally cylindrical data storage member having a radius transverse to a rotational axis thereof;

a drive structure disposed in said interior space and including a rotationally drivable spindle member operative to support the data storage member with its rotational axis generally parallel to said exterior wall member, upon insertion thereof inwardly through said opening means, and rotate the data storage member about its rotational axis, said spindle member being inwardly spaced apart from said exterior wall member by a distance substantially less than the radius of the data storage member, wherein a substantial portion of the spindle member-supported data storage member projects outwardly beyond said exterior wall member to thereby materially reduce the interior outer housing space required by said drive structure; and housing means, carried by said outer housing, for receiving and shielding the outwardly projecting data storage member portion during operation of said drive structure, said housing means being retractable into said outer housing interior space when the data storage member is removed from said drive structure, said housing means, when retracted into said outer housing interior space, being telescoped with said drive structure, said exterior wall portion including an external wall section extending transversely to said exterior wall member and outwardly overlying said spindle member, said opening means including a first opening extending through said external wall section, said housing means including a housing structure retractable into said outer housing and extendable outwardly therefrom, in a direction transverse to said exterior wall member, said housing structure having a second opening therein which, with said housing structure extended outwardly from said outer housing, forms with said first opening a combined opening adapted to receive the data storage member for operative placement on said spindle member.

6. The computer apparatus of claim 5 further comprising:

cover means, carried by said outer housing and said housing structure, for selectively covering and uncovering said first and second openings.

7. The computer apparatus of claim 6 wherein said cover means include:

a first cover plate member secured to said outer housing for pivotal movement relative thereto between first and second positions in which said first cover plate member respectively covers and uncovers said first opening, and a second cover plate member secured to said housing structure for pivotal movement relative thereto between first and second positions in which said second cover plate member respectively covers and uncovers said second opening.

8. The computer apparatus of claim 7 wherein, with said housing structure in its retracted position, and said first and second cover plate members in said first positions thereof, said first cover plate member overlies said second cover plate member in a facing, generally parallel relationship therewith.

* * * * *